US011545154B2

(12) United States Patent
Park et al.

(10) Patent No.: US 11,545,154 B2
(45) Date of Patent: Jan. 3, 2023

(54) METHOD AND APPARATUS WITH REGISTRATION FOR SPEAKER RECOGNITION

(71) Applicant: SAMSUNG ELECTRONICS CO., LTD., Suwon-si (KR)

(72) Inventors: Sung-Un Park, Suwon-si (KR); Kyuhong Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 16/872,548

(22) Filed: May 12, 2020

(65) Prior Publication Data

US 2021/0125617 A1     Apr. 29, 2021

(30) Foreign Application Priority Data

Oct. 29, 2019   (KR) ........................ 10-2019-0135438

(51) Int. Cl.
| | |
|---|---|
| *G10L 17/00* | (2013.01) |
| *G10L 17/02* | (2013.01) |
| *G10L 17/04* | (2013.01) |
| *G10L 17/08* | (2013.01) |
| *G06F 16/683* | (2019.01) |

(52) U.S. Cl.
CPC ............ *G10L 17/00* (2013.01); *G06F 16/683* (2019.01); *G10L 17/02* (2013.01); *G10L 17/04* (2013.01); *G10L 17/08* (2013.01)

(58) Field of Classification Search
CPC ......... G10L 17/00; G10L 17/02; G10L 17/04; G10L 17/08; G06F 16/683

USPC ......................................................... 704/246
See application file for complete search history.

(56) References Cited

U.S. PATENT DOCUMENTS

| | | | |
|---|---|---|---|
| 6,519,561 B1 * | 2/2003 | Farrell ................... | G10L 17/04 |
| | | | 704/250 |
| 11,354,701 B1 * | 6/2022 | Wang ................. | G06Q 30/0244 |

(Continued)

FOREIGN PATENT DOCUMENTS

| | | |
|---|---|---|
| JP | 2004294755 A | 10/2004 |
| KR | 101209033 B1 | 12/2012 |

(Continued)

*Primary Examiner* — Edwin S Leland, III
(74) *Attorney, Agent, or Firm* — NSIP Law

(57) ABSTRACT

Disclosed is a method and apparatus with recognition for speaker recognition. The method includes determining whether an input feature vector corresponding to a voice signal of a speaker meets a candidate similarity criterion with at least one registered data included in a registration database, selectively, based on a result of the determining of whether the input feature vector meets the candidate similarity criterion, constructing a candidate list based on the input feature vector, determining whether a candidate input feature vector, among one or more candidate input feature vectors constructed in the candidate list in the selective constructing of the candidate list, meets a registration update similarity criterion with the at least one registered data, and selectively, based on a result of the determination of whether the candidate input feature vector meets the registration update similarity criterion, updating the registration database based on the candidate input feature vector.

40 Claims, 7 Drawing Sheets

(56) References Cited

U.S. PATENT DOCUMENTS

| | | | | |
|---|---|---|---|---|
| 2003/0163739 A1* | 8/2003 | Armington | ........... | H04L 9/3226 |
| | | | | 713/186 |
| 2012/0084078 A1* | 4/2012 | Moganti | ................ | G10L 17/00 |
| | | | | 704/201 |
| 2014/0172430 A1* | 6/2014 | Rutherford | ............ | G06Q 20/20 |
| | | | | 704/273 |
| 2015/0081295 A1* | 3/2015 | Yun | ........................ | G10L 17/24 |
| | | | | 704/244 |
| 2015/0112680 A1* | 4/2015 | Lu | ........................ | G10L 15/142 |
| | | | | 704/244 |
| 2015/0261944 A1* | 9/2015 | Hosom | ................... | G06F 21/32 |
| | | | | 726/19 |
| 2016/0293167 A1* | 10/2016 | Chen | ................ | H04N 21/23476 |
| 2018/0226079 A1* | 8/2018 | Khoury | ................... | G10L 17/04 |
| 2018/0293988 A1* | 10/2018 | Huang | ................... | G10L 17/20 |
| 2018/0366124 A1* | 12/2018 | Cilingir | ................... | G10L 17/04 |
| 2021/0125617 A1* | 4/2021 | Park | ........................ | G10L 17/04 |
| 2021/0174702 A1* | 6/2021 | Ishii | ........................ | G10L 15/02 |
| 2021/0263309 A1* | 8/2021 | Rivera Cintron | ..... | G06F 1/3265 |

FOREIGN PATENT DOCUMENTS

| | | | |
|---|---|---|---|
| KR | 1020170049317 A | | 5/2017 |
| KR | 1020180130940 A | | 12/2018 |
| KR | 1020190001141 A | | 1/2019 |
| KR | 1020190044945 A | | 5/2019 |

* cited by examiner

METHOD AND APPARATUS WITH REGISTRATION FOR SPEAKER RECOGNITION

CROSS-REFERENCE TO RELATED APPLICATIONS

This application claims the benefit under 35 USC § 119(a) of Korean Patent Application No. 10-2019-0135438 filed on Oct. 29, 2019 in the Korean Intellectual Property Office, the entire disclosure of which is incorporated herein by reference for all purposes.

BACKGROUND

1. Field

The following description relates to a method and apparatus with registration for speaker recognition.

2. Description of Related Art

Speaker recognition technology is a technology to identify or authenticate a person through a speaker's voice, and may be applied to various fields such as identity verification in meetings, conferences, and conversations.

A voice of a speaker may change based on changes in emotion, age, and health state. Also, an input voice feature may vary dependent on the ambient environment in which the recognition is performed. However, typically speaker recognition is performed only based on the initially registered voice feature, which may lead to a degradation in performance of recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes determining whether an input feature vector, among one or more input feature vectors corresponding to a voice signal of a speaker, meets a candidate similarity criterion with at least one registered data included in a registration database, selectively, based on a result of the determining of whether the input feature vector meets the candidate similarity criterion, constructing a candidate list based on the input feature vector, determining whether a candidate input feature vector, among one or more candidate input feature vectors constructed in the candidate list in the selective constructing of the candidate list, meets a registration update similarity criterion with the at least one registered data, selectively, based on a result of the determination of whether the candidate input feature vector meets the registration update similarity criterion, updating the registration database based on the candidate input feature vector.

The method may further include performing a speaker verifying operation by verifying or identifying a current speaker based on whether a feature vector corresponding to a current voice signal of the current speaker meets a registered user similarity criterion with respect to the updated registration database.

The method may further include performing a speaker verifying operation by verifying or identifying a current speaker based on whether a feature vector corresponding to a current voice signal of the current speaker meets a registered user similarity criterion with respect to the registration database.

The method may further include performing a speaker verifying operation by verifying or identifying the speaker based on whether the input feature vector corresponding to the voice signal of the speaker meets a registered user similarity criterion with respect to the registration database or the updated registration database.

In response to the input feature vector not meeting the registered user similarity criterion, the method may include constructing a rejection candidate list based on the input feature vector.

The method may further include performing another speaker verifying operation by verifying or identifying a current speaker based on whether a feature vector corresponding to a current voice signal of the current speaker meets the registered user similarity criterion with respect to the registration database or the updated registration database, and based on the rejection candidate list.

The registered user similarity criterion may be a lesser similarity requiring criterion than the registration update similarity criterion.

The determining of whether the candidate input feature vector meets the registration update similarity criterion, and the selective updating of the registration database may be automatically performed based on a predetermined period.

The constructing of the candidate list based on the input feature vector may include adding the input feature vector to an existing candidate list that includes at least one of the one or more of the candidate input feature vectors.

The at least one registered data may include at least one of a registration feature vector and a registration feature model, the registration feature vector may be classified into a plurality of groups based on a predetermined criterion, and the registration feature model may be determined based on respective registration feature vectors included in each of the plurality of groups.

The updating of the registration database may include generating a new registered data model including a feature vector, among candidate input feature vectors in the candidate list, that meets the registration update similarity criterion with respect to a previous registered data model included in the registration database, calculating a similarity between the previous registered data model and the new registered data model, and updating the registration database based on the calculated similarity.

The updating of the registration database based on the calculated similarity may include changing the previous registered data model using the feature vector included in the new registered data model when the calculated similarity meets a predetermined similarity threshold, and adding the new registered data model to the registration database when the calculated similarity does not meet the predetermined similarity threshold.

The changing of the previous registered data model may include changing the previous registered data model based on a value corresponding to a weighted sum of feature vectors included in the new registered data model and the previous registered data model.

The changing of the previous registered data model may include changing the previous registered data model to the new registered data model, based on the feature vector included in the new registered data model and another feature vector included in the previous registered data model.

The registration database may include at least one condition-information registration database corresponding to condition information of one or more speakers, and the updating of the registration database may include acquiring condition information of one or more feature vectors corresponding to respective voice signals of the speaker, and updating the condition-information registration database based on the condition information of the one or more feature vectors.

The candidate similarity criterion may be a first threshold and the registration update similarity criterion is a second threshold, and the second threshold is greater than the first threshold.

The selective constructing of the candidate list based on the result of the determining of whether the input feature vector meets the candidate similarity criterion may include selecting to construct the candidate list based on the input feature vector meeting the candidate similarity criterion and not meeting the registration update similarity criterion.

The selective updating of the registration database may include selectively updating the registration database based on whether the input feature vector meets the registration update similarity criterion with the at least one registered data.

When the input feature vector meets the registration update similarity criterion and the updating of the registration database is resultantly selected, the updating of the registration database may include generating a new registered data model including a feature vector, among the one or more input feature vectors corresponding to the voice signal of a speaker, that meets the registration update similarity criterion with respect to a previous registered data model included in the registration database, calculating a similarity between the previous registered data model and the new registered data model, and updating the registration database based on the calculated similarity.

In one general aspect, provided is a non-transitory computer-readable storage medium storing instructions that, when executed by a processor, cause the processor to perform one or more or all operations described herein.

In one general aspect, a processor-implemented method includes determining whether a candidate input feature vector, among one or more candidate input feature vectors constructed in a candidate list in respective one or more previous speaker verifying operations, meets a registration update similarity criterion with registered data of a registration database, selectively, based on a result of the determination of whether the candidate input feature vector meets the registration update similarity criterion, updating the registration database based on the candidate input feature vector, and performing a speaker verifying operation by verifying a speaker based on whether an input feature vector, corresponding to a current voice signal of the speaker, meets a registered user similarity criterion with respect to the updated registration database.

The method may further include constructing the candidate list to include the candidate input feature vector based on: the candidate input feature vector having met a candidate similarity criterion with the registered data included in the registration database prior to the selective updating of the registration database; and the candidate input feature vector having not met the registered user similarity criterion with respect to the registration database prior to the selective updating of the registration database.

The method may further include constructing the candidate list to include the candidate input feature vector based on: the candidate input feature vector having met a candidate similarity criterion with the registered data included in the registration database prior to the selective updating of the registration database; and the candidate input feature vector having met the registered user similarity criterion with respect to the registration database prior to the selective updating of the registration database.

In one general aspect, a processor-implemented method includes performing a speaker verifying operation by verifying or identifying a speaker based on whether an input feature vector corresponding to a voice signal of the speaker meets a registered user similarity criterion with respect to a registration database, selectively, based on whether the input feature vector meets a candidate similarity criterion with respect to the registration database, constructing a candidate list based on the input feature vector, and selectively, based on whether a candidate input feature vector resulting from the selective constructing of the candidate list meets a registration update similarity criterion with respect to the registration database, updating the registration database based on the candidate input feature vector.

The constructing of the candidate list may be selectively performed further dependent on a result of the speaker verifying operation.

In one general aspect, an apparatus includes one or more processors configured to selectively, dependent on whether an input feature vector corresponding to a voice signal of a speaker meets a candidate similarity criterion with a registered data included in a registration database, construct a candidate list based on the input feature vector, and selectively, dependent on whether a candidate input feature vector constructed in the candidate list meets a registration update similarity criterion with respect to the registration database, update the registration database based on the candidate input feature vector.

The one or more processors may be further configured to perform a speaker verifying operation to verify or identify a current speaker based on whether a feature vector corresponding to a current voice signal of the current speaker meets a registered user similarity criterion with respect to the updated registration database.

The one or more processors may be further configured to perform a speaker verifying operation to verify or identify a current speaker based on whether a feature vector corresponding to a current voice signal of the current speaker meets a registered user similarity criterion with respect to the registration database.

The one or more processors may be further configured to perform a speaker verifying operation to verify or identify the speaker based on whether the input feature vector corresponding to the voice signal of the speaker meets a registered user similarity criterion with respect to the registration database or the updated registration database.

The one or more processors may be further configured to, in response to the input feature vector being determined to not meet the registered user similarity criterion, construct a rejection candidate list based on the input feature vector.

The one or more processors may be further configured to perform another speaker verifying operation to verify or identify a current speaker based on whether a feature vector corresponding to a current voice signal of the current speaker meets the registered user similarity criterion with respect to the registration database or the updated registration database, and based on the rejection candidate list.

The one or more processors may be configured to select to perform the construction of the candidate list based on the input feature when the input feature vector meets the candidate similarity criterion and the input feature vector does not meet the registered user similarity criterion.

The one or more processors may be configured to select to perform the construction of the candidate list based on the input feature when the input feature vector meets the candidate similarity criterion and the input feature vector meets the registered user similarity criterion.

The apparatus may further include a memory storing instructions that when executed by the one or more processors configure the one or more processors to perform the selective construction of the candidate list, the selective update of the registration database, and the performance of the speaker verifying operation.

The registered user similarity criterion may be a lesser similarity requiring criterion than the registration update similarity criterion.

For the updating of the registration database, the one or more processors may be configured to generate a new registered data model including a feature vector, among candidate input feature vectors in the candidate list, that meets the registration update similarity criterion with respect to a previous registered data model included in the registration database, calculate a similarity between the previous registered data model and the new registered data model, and update the registration database based on the calculated similarity.

For the updating of the registration database based on the calculated similarity, the one or more processors may be configured to change the previous registered data model using the feature vector included in the new registered data model when the calculated similarity meets a predetermined similarity threshold, and add the new registered data model to the registration database when the calculated similarity does not meet the predetermined similarity threshold.

The registration database may include at least one condition-information registration database corresponding to condition information of one or more speakers, and, for the updating of the registration database, the one or more processors may be configured to acquire condition information of one or more feature vectors corresponding to respective voice signals of the speaker, and update the condition-information registration database based on the condition information of the one or more feature vectors.

For the selective construction of the candidate list, the one or more processors may be configured to select to perform the construction of the candidate list in response to the input feature vector being determined to meet the candidate similarity criterion and determined to not meet the registration update similarity criterion.

For the selective update of the registration database, the one or more processors may be configured to update the registration database in response to the input feature vector being determined to meet the registration update similarity criterion with the registered data.

Other features and aspects will be apparent from the following detailed description, the drawings, and the claims.

Figure 1:
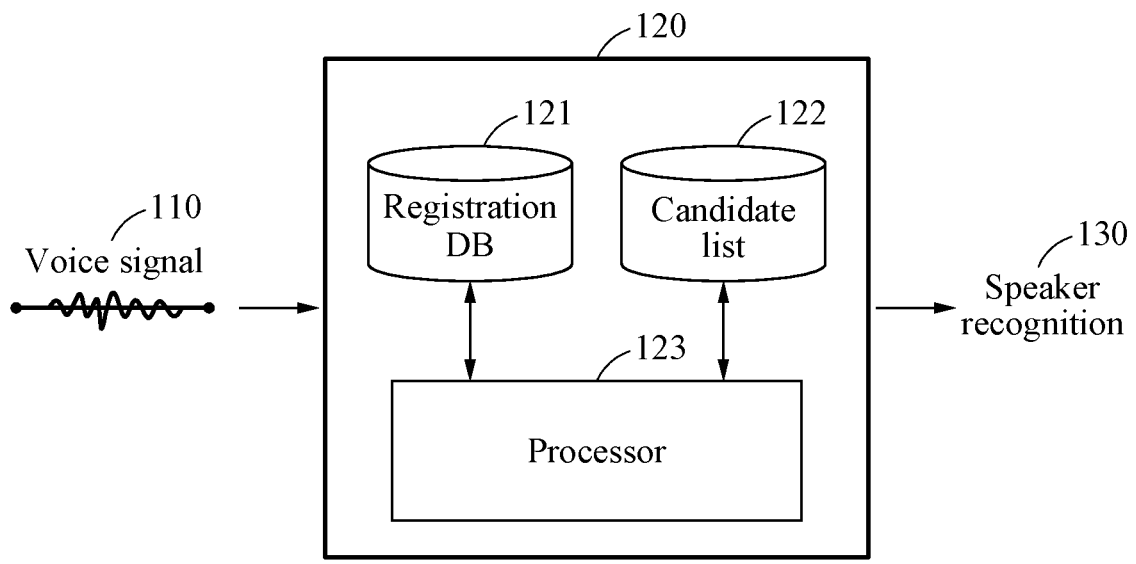
FIG. 1 illustrates an example method with speaker recognition, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of thereafter understood related structures or functions will be omitted when it is deemed that such description could cause ambiguous interpretation of the disclosure of this application.

FIG. 1 illustrates an example method with speaker recognition, according to one or more embodiments. Hereinafter the method of FIG. 1 will be referred to as a speaker recognition method for convenience of explanation, though examples are not limited thereto.

Referring to FIG. 1, the speaker recognition method is performed by a speaker recognition apparatus 120. The speaker recognition apparatus 120 includes a registration database 121, a candidate list 122, and a processor 123, for example. The processor 123 also represents one or more processors and one or more memories storing instructions executable by the one or more processors that when executed by the one or more processors configure the one or more processors to perform one or more or all operations described herein.

The speaker recognition apparatus 120 receives a voice signal 110 uttered by a user and performs a speaker recognition operation 130, according to one or more embodiments, based on the received voice signal 110. The speaker recognition operation 130 refers to an operation of analyzing a unique characteristic of a user who has uttered the voice signal based on the received voice signal 110 and automatically determining an utterer of the received voice signal. The speaker recognition operation 130 is a speaker identification performed based on a voice recognition and may be divided into a speaker verification operation and a speaker identification operation. The speaker verification operation is to verify whether a speaker is a registered user, for example, an identity or not. The speaker identification operation is to identify a speaker from among registered users.

The speaker recognition apparatus 120 receives the voice signal 110 uttered by the user and performs a voice recognition operation to recognize the received voice signal 110. The voice recognition operation refers to sensing or recognizing a voice signal, which is a received audio signal, as a voice corresponding to a speech of the user. The speaker recognition apparatus 120 performs the speaker recognition operation 130 based on the voice recognized through the voice recognition operation.

Also, as a premise for speaker recognition, a speaker registration may be performed. A series of operations performed by the user to register a voice signal for speaker recognition may be referred to as a registration operation. For example, the speaker recognition apparatus 120 performs the speaker registration based on the voice signal uttered by the user. The user may have purchased the speaker recognition apparatus 120, and then initially uttered a voice signal for user registration. In this example, the speaker recognition apparatus 120 registers the uttered voice as a voice signal for speaker recognition and terminates the user registration.

Thereafter, when the voice signal 110 is received for the speaker recognition, the speaker recognition apparatus 120 performs the speaker recognition operation 130 to determine whether the speaker having uttered the received voice signal 110 matches the registered user. For example, the speaker recognition apparatus 120 compares a voice feature corresponding to the voice signal 110 received for the speaker recognition with a voice feature corresponding to the voice signal 110 to determine whether the corresponding voice feature has a similarity or identity with a voice feature extracted when the speaker is registered. Based on a comparison result, the speaker recognition apparatus 120 determines whether the speaker having uttered the voice signal is the registered user.

As a speaker recognition result, when the speaker having uttered the voice signal is the registered user, the speaker recognition apparatus 120 may recognize a subsequently uttered voice signal by the user, and then perform an operation corresponding to the recognized voice signal. Thus, the illustrated speaker recognition operation 130 of FIG. 1 is also representative of the additional or a further performance of speech recognition of the uttered voice signal of the registered user, and the selective performance by the speech recognition apparatus 120 of various available operations corresponding to the speech recognized voice signal. Also, as a speaker recognition result, when the speaker having uttered a voice signal is determined to not be a/the registered user, the speaker recognition apparatus 120 may terminate the voice recognition without completing speech recognition to determine or recognize the additional operation, e.g., the uttered command or inquiry in or subsequent to the voice signal, or merely without performing such speech recognition or without performing the speech recognized additional operation in the voice signal, e.g., the command or inquiry as recognized. For example, the speaker recognition apparatus 120 outputs a message indicating "unregistered user" and rejects or fails to perform the additional operation corresponding to the voice signal uttered by the speaker.

Example speaker recognition technology examples include, or may be widely applied to, for example, management of personal electronic documents, phone or Internet banking, and electronic commerce. Such voice-based speaker recognition technology may be desired since there may be lesser instances of theft or forgery, e.g., compared to physical identification sources such as a card, a stamp, a signature, and an identification card. Also, while expensive equipment may be used or required for the input of other biometric measurement modalities such as a fingerprint or retinas, a voice may be processed over a short or relatively long distances using an acoustic sensor such as an example microphone, e.g., which may have a relatively low cost. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The speaker recognition apparatus 120 may complete a user registration by registering a voice uttered in the registration operation as a voice signal for speaker recognition.

As noted above, the voice of a speaker may change based on changes in emotion, age, and health states of the speaker. Further, features of a captured voice may vary depending on the ambient environments in which recognition is performed. Thus, considering typical speaker recognition approaches, when a speaker recognition is performed, e.g., in a continuous manner, based only on the initially registered voice feature, such typical speaker recognition approaches may fail to cope with such state and environmental changes, which may lead to a degradation in performance and inaccurate failures to recognize authorized or registered users.

The speaker recognition apparatus 120 reflects a voice confirmed as the speaker's own voice among voice signals of the speaker received in the speaker recognition operation 130, as a registered voice of the speaker. Through this, the speaker recognition apparatus 120 may automatically obtain or collect registered voices of the speaker for various states and environments without direct intervention of the user for registration. In addition to the registration database 121, the speaker recognition apparatus 120 may further include the candidate list 122, thereby obtaining a candidate list of registered voices for a user for various states and environments.

Figure 2:
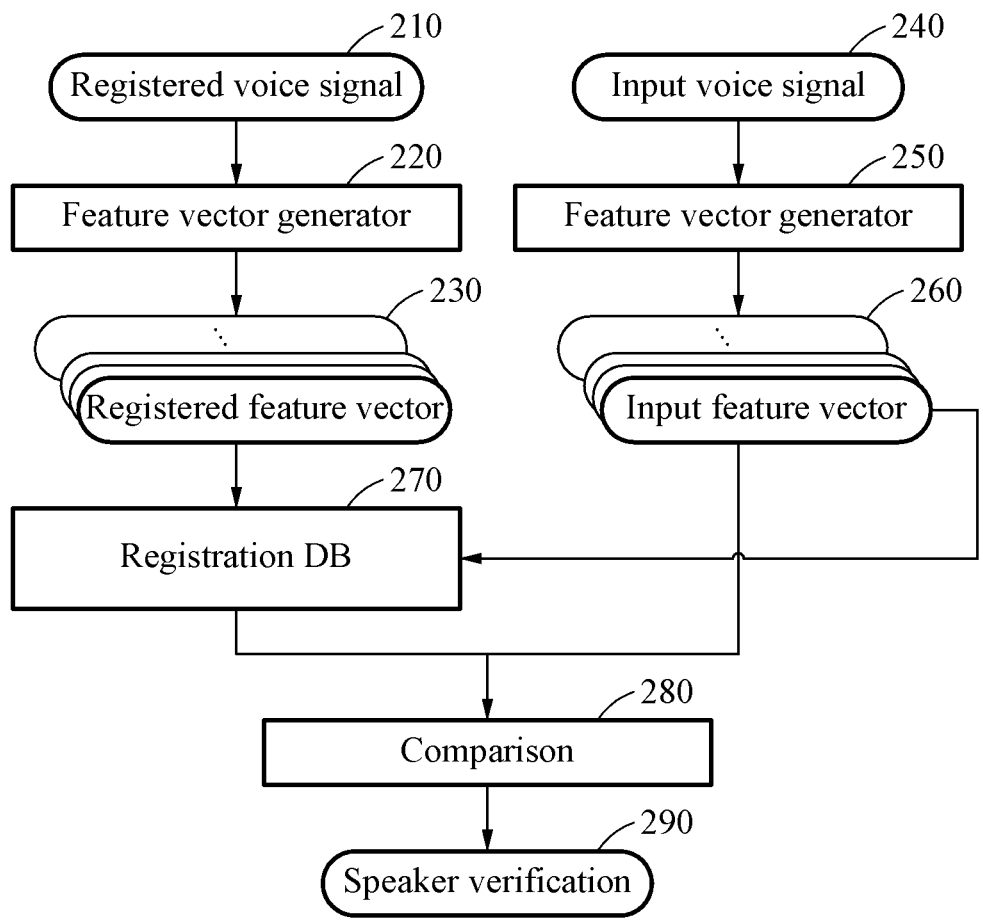
FIG. 2 illustrates an example method with speaker recognition, according to one or more embodiments.

FIG. 2 illustrates an example method with speaker recognition, according to one or more embodiments. The method of FIG. 2 may be implemented by a speaker recognition apparatus that may be the speaker recognition apparatus 120 of FIG. 1, e.g., having/using the processor 123, the registration database 121, and/or the candidate list 122, noting that such examples are for convenience of explanation with respect to one or more or more embodiments and are not intended to limit embodiments to the same.

Referring to FIG. 2, in a registration operation, a feature vector generator 220 of the example speaker recognition apparatus generates a registered feature vector 230 from a registered voice signal 210 of a speaker. Herein, feature vectors may include respective information for distinguishing each of plural recognition factors with respect to a voice signal, as a non-limiting example. For example, the generated feature vectors of FIG. 2 may each have time-based frequency information in a form having compressed components, which can be used for recognition among voice signals.

The speaker recognition apparatus stores the generated feature vector(s) from the feature vector generator 220 in a registration database 270, and/or converts a plurality of registered feature vectors into a registered feature model and stores the registered feature model in the registration database 270. In the registration operation, the speaker recognition apparatus receives plural registered voice signals 210, e.g., a predetermined number of times, for example, five times from a user, and stores the five corresponding registered feature vectors extracted from each of the registered voice signals 210 in the registration database 270. Also, the speaker recognition apparatus may store a plurality of registered feature models in the database 270. For example, the registered feature model may include an average and a variance of a plurality of such registered feature vectors. Herein, the term registered data may also be used to reference one or more registered feature vectors and/or one or more registered feature models.

A feature vector generator 250 of the speaker recognition apparatus may generate an input feature vector 260 of the speaker from an input voice signal 240, e.g., as received or captured by the speaker recognition apparatus. Also, the speaker recognition apparatus compares the registered data of the registration database 270 and the input feature vector 260 in operation 280 and determines whether to perform speaker recognition in operation 290. The speaker recognition apparatus determines whether to perform the speaker recognition by calculating a similarity between the registered data and the input feature vector 260. The similarity between the registered data and the input feature vector 260 may be calculated using, for example, a distance between two vectors and a cosine similarity. In addition, other various similarity calculation methods are also available in alternative examples.

For example, in an initial registration operation, the speaker recognition apparatus generates a registered feature vector by receiving or capturing a voice signal corresponding to a voice "hi, bixby" of the speaker and stores the generated registered feature vector of the voice signal in the registration database 270. Thereafter, in speaker recognition operations, when an input voice signal is received or captured corresponding to the voice "hi, bixby", e.g., with or without a partial or full speech recognition of the input voice signal, the speaker recognition apparatus will have generated an input feature vector for the input voice signal and compares the generated input feature vector to registered data stored in the registration database, thereby determining whether to perform additional registration and/or speaker verification.

In an example, in operation 280, when a registered feature model is compared to the input feature vector, an operation speed may increase and a robust result may be output in comparison to the example in which registered feature vectors are compared to the input feature vector. For brevity, the following description will be based on an example in which the speaker recognition operation is performed based on the registered feature model in the registration database 270. Even in this example of comparing the registered feature model to the input feature vector, a separate registered feature vector corresponding to the input feature vector may also be stored in the registration database 270 to update the registration database 270.

A typical speaker recognition operation may be performed in an environment with a lot of noise, while a corresponding typical initial registration operation may be performed in a quiet environment with less noise. In such typical approaches, nonmatching between a registered vector generated in such a typical initial registration operation and the noisy input feature vector generated in such a typical speaker recognition operation may occur, which may lead to a degradation in recognition performance. Also, when a number of utterance times of a voice signal corresponding to a recognized sentence is small, an error is likely to occur in such a feature vector, which may cause difficulty in such a typical speaker recognition.

In one or more example, the speaker recognition apparatus updates the registration database 270 using an input feature vector, from among the input feature vectors 260, satisfying a predetermined criterion. In one or more examples, the speaker recognition apparatus may also improve a performance of the speaker recognition operation by securing the registration database for various states and environments of the speaker without additional effort of a user, e.g., through automated registration considerations and corresponding selective updates/replacements with respect to the registration database by the speaker recognition apparatus.

Figure 3:
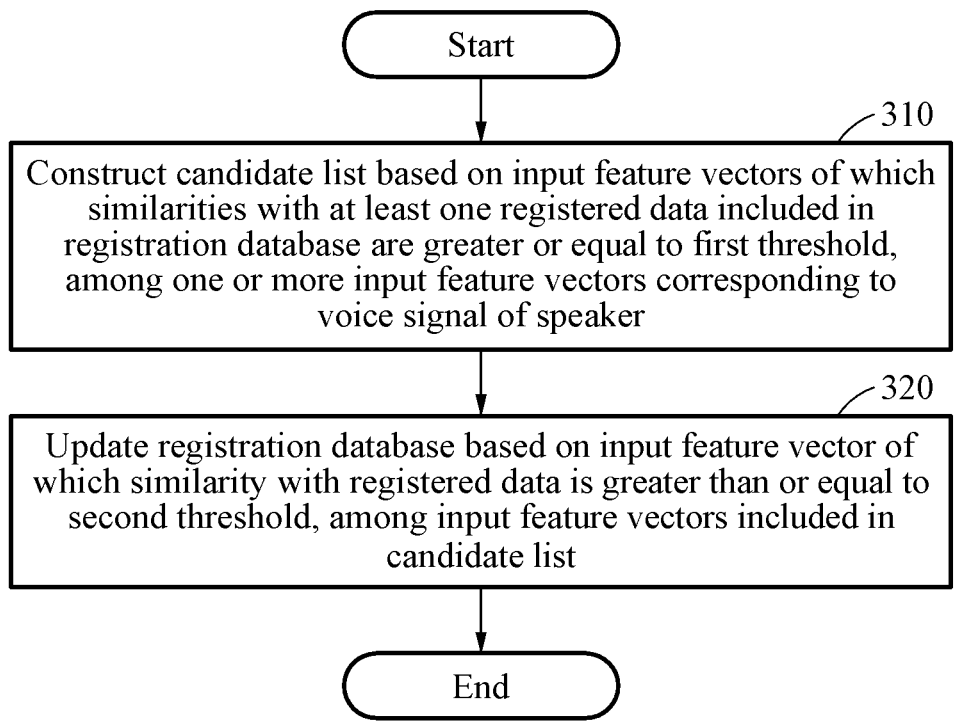
FIG. 3 is a flowchart illustrating an example method with registration for speaker recognition, according to one or more embodiments.

FIG. 3 is a flowchart illustrating an example method with registration for speaker recognition, according to one or more embodiments. The method of FIG. 3 may be implemented by a speaker recognition apparatus that may be the speaker recognition apparatus of FIG. 1 and/or the speaker recognition apparatus of FIG. 2, noting that such examples are for convenience of explanation with respect to one or more or more embodiments and are not intended to limit embodiments to the same. In addition, operations of FIG. 3 may be performed in the order and manner shown, and the order of some operations may be changed or some operations may be omitted without departing from the spirit and scope of the illustrated embodiment. Operations of FIG. 3 may be performed in parallel or simultaneously.

The speaker recognition apparatus receives a voice signal of a speaker and performs a similarity determination of the received voice signal and one or more registered data models included in a registration database, e.g., in the speaker recognition apparatus. The speaker recognition apparatus selectively performs a speaker recognition operation, a registration database updating operation, and a candidate list constructing operation depending on the similarity determination.

In an example, the speaker recognition apparatus determines whether a speaker's voice signal received in the speaker recognition operation is the same as a registered speaker's voice signal. When the speaker recognition apparatus determines that the received speaker's voice signal is the same as the registered speaker's voice signal, and when a similarity between the received speaker's voice signal and the registered speaker's voice signal meets, e.g., exceeds, a predetermined threshold, for example, a second threshold, the speaker recognition apparatus updates the registration database using the received speaker's voice signal, e.g., corresponding to the aforementioned "hi, bixby" in the received voice signal, as a non-limiting example. In such an example, when the speaker recognition apparatus determines that the received speaker's voice signal is sufficiently the same as the registered speaker's voice signal (for example, determines that a similarity between at least one registered data, e.g., at least one registered speaker's voice signal, vector, or model of the same, included in the registration database and at least one input feature vector corresponding to the speaker's voice signal is greater than or equal to a first threshold), but the similarity between the received speaker's voice signal and the registered speaker's voice signal does not meet, e.g., does not exceed, a predetermined threshold, for example, the second threshold, the speaker recognition apparatus may alternatively merely add the corresponding voice signal to a candidate list distinguished from the registered data. Thus, here, the first threshold may be considered a similarity constraint condition or candidate similarity criterion for determining whether to construct or add to the candidate list, while the second threshold may be similarity constraint condition or registration update similarity criterion for determining whether to update the registration database. As will be explained in greater detail further below, when the registration database updating operation is performed, the speaker recognition apparatus may further re-verify the candidate list and selectively update the registration database based on a result of the re-verification.

Referring to FIG. 3, in operation 310, the speaker recognition apparatus may construct the candidate list based on input feature vectors of which similarities with at least one registered data included in the registration database meet, e.g., are greater or equal to the first threshold, among one or more input feature vectors corresponding to a voice signal of a speaker. The candidate list may be a group of input feature vectors having respective similarity results that currently are insufficient to update the registration database, e.g., their similarities meet the first threshold but fails to meet the second threshold, and, thus, may be potential feature vectors for future update of the registration database. Such a candidate list will be described in greater detail with reference to FIG. 4.

As described above, the speaker recognition apparatus may selectively update the registration database based on an input feature vector, among input feature vectors included in the received speaker's voice signal, depending on whether a similarity with the registered data meets, e.g., is greater than or equal to, a second threshold. Also, the speaker recognition apparatus may selectively update the registration database based on input feature vectors that have been added to the candidate list.

For example, in operation 320, the speaker recognition apparatus selectively update the registration database based on an input feature vector, among input feature vectors included in the candidate list, of which a similarity with the registered data meets, e.g., is greater than or equal to a second threshold. Thus, the speaker recognition apparatus may update the registration database based on a voice confirmed as the speaker's own voice among voice signals of the speaker received in a speaker recognition operation, thereby obtaining registered voices of the speaker for various states and environments, e.g., without direct intervention of a user for registration. The second threshold, which is the example similarity constraint condition or candidate similarity criterion for determining whether to update the registration database, is greater than the first threshold, as an example similarity constraint condition or candidate similarity criterion for determining the construction/addition of the candidate list. The registration database may be updated in various ways. For example, all input feature vectors of which similarities with the registered data meet, e.g., are greater than or equal to, the second threshold may be added to the registration database, e.g., with or without addition to the candidate list. Also, the speaker recognition apparatus may update the registration database according to the example Equation 1 below.

$$\text{index}_{i...N} = \underset{j=1,...,K}{\operatorname{argmin}}\{dist(\text{input}, featdb_j)\} \quad \text{Equation 1}$$

$$\text{model} = \{avg(featdb_{index}), var(featdb_{index})\}$$

$$f(x) = \begin{cases} \text{update}, & \text{if } dist(\text{model}, prevmodel) < \gamma \\ \text{create}, & \text{otherwise} \end{cases}$$

In Equation 1, the similarity is expressed by a distance. For example, as a distance between two vectors decreases, a similarity between the two vectors increases. The speaker recognition apparatus obtains a distance between a registered feature vector featdb and an input feature vector input, and then obtains N vectors corresponding to a corresponding minimum distance. The speaker recognition apparatus generates a new registered feature model based on the obtained N vectors and the input feature vector. For example, the new registered feature model may include an average vector avg(featdb$_{index}$) and a variance vector var(featdb$_{index}$) of feature vectors. The speaker recognition apparatus compares the new registered feature model to a previous registered feature model prevmodel. When the distance is less than a threshold y, the speaker recognition apparatus updates the previous registered feature model using a value of the previous registered feature model and the input feature vector.

For example, when updating the previous registered feature model, the speaker recognition apparatus may use a sum of a predetermined ratio of an average value of the previous registered feature model and a predetermined ratio of the input feature vector to update the previous registered feature model. Also, the speaker recognition apparatus may calculate a new average and a new variance using an input feature vector and the feature vectors used to generate the previous registered feature model.

The speaker recognition apparatus compares the new registered feature model to the previous registered feature model. As a comparison result, when the distance meets, e.g., is greater than or equal to, the threshold y, the speaker recognition apparatus adds the new registered feature model to the registration database.

The speaker recognition apparatus may further perform the speaker recognition operation based on an input feature vector, among the one or more input feature vectors corresponding to the voice signal of the speaker, of which a similarity with the registered data meets, e.g., is greater than or equal to, a third threshold. The third threshold, which is an example similarity constraint condition or registered user similarity criterion for the speaker recognition operation, may be greater than the first threshold, as a similarity constraint condition or candidate similarity criterion for determining a candidate list construction. In some cases, the third threshold may also be less than or equal to the first threshold. The speaker recognition operation with respect to the third threshold may include a determination of whether the speaker is recognized as a registered user and/or whether the speaker is not recognized as a registered user.

When the speaker having uttered the voice signal is a registered user, e.g., the speaker recognition apparatus recognizes a voice signal including non-limiting example "hi, bixby" utterance as being by a registered user and, for example, recognizes a subsequent received additional operation, e.g., a command or inquiry, additionally included in or corresponding to the recognized voice signal. When the speaker having uttered the voice signal is not a registered user, the speaker recognition apparatus terminates voice recognition without performing the additional operation. For example, the speaker recognition apparatus may output a message indicating "unregistered user" and fails or reject to perform the additional operation additionally included in or corresponding to the voice signal uttered by the speaker.

Figure 4:
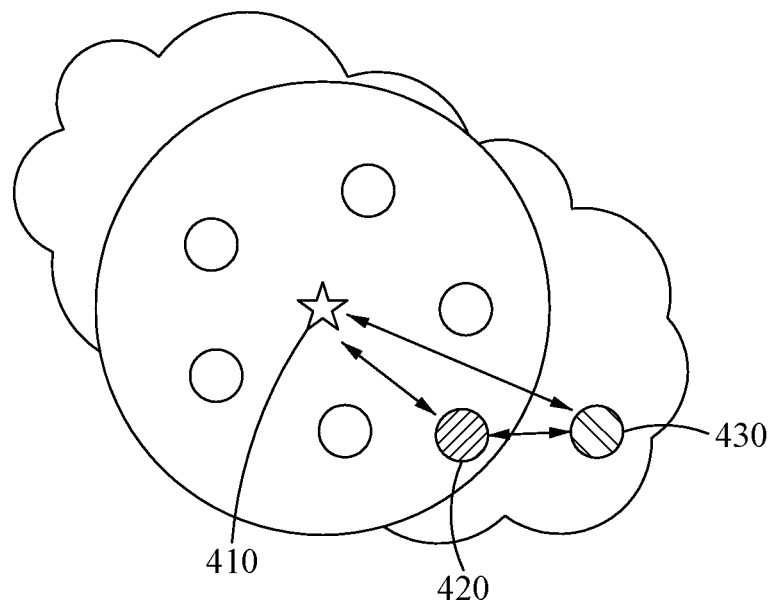
FIG. 4 illustrates an example method of updating a registration database based on a candidate list, according to one or more embodiments.

FIG. 4 illustrates an example method of updating a registration database based on a candidate list, according to one or more embodiments. The method of FIG. 4 may be implemented by a speaker recognition apparatus that may be the speaker recognition apparatus of FIG. 1, the speaker recognition apparatus of FIG. 2, and/or the speaker recognition apparatus of FIG. 3, noting that such examples are for convenience of explanation with respect to one or more embodiments and are not intended to limit embodiments to the same.

When a speaker attempts to be authenticated, the speaker recognition apparatus determines whether to update a registration database based on a similarity determination for a similarity between an input feature vector and registered data currently included in the registration database. Since the similarity determination is performed based on the registration database at a current point in time, a result of a renewed similarity determination may be different after the registration database has been updated. In this regard, the speaker recognition apparatus may rescue (previous) input feature vectors that were dropped from a registration database update target due to a difference in authentication order but still added to the aforementioned candidate list. For example, if an input feature vector of a previous point in time met the aforementioned first threshold similarity constraint, but did not meet the aforementioned second threshold similarity constraint, that input feature vector may have at least been added to the candidate list.

Periodically or when a predetermined event occurs (for example, when a registration database updating operation is performed), the speaker recognition apparatus determines whether there exists an input feature vector, among the input feature vectors included in the candidate list, that has a similarity with at least one registered data included in the updated registration database that meets, e.g., is greater than or equal to, the second threshold, and if such an input feature vector is found to exist the speaker recognition apparatus may newly update the registration database with and/or based on the found input feature vector.

In a case of updating the registration database using such one or more input feature vectors included in the candidate list that meet this second threshold similarity constraint, the speaker recognition apparatus updates the registration database based on whether the one or more input feature vectors included in the candidate list has a respective similarity with the registered data that meets, e.g., is greater than or equal to, a sixth threshold that is greater than the second threshold. Having the sixth threshold greater than the second threshold may reduce a possibility that a voice of another user is inaccurately updated. For example, in the case of updating the registration database using the one or more input feature vectors included in the candidate list, there may be a greater possibility that a voice of another user is updated compared to the case of when the registration database is updated based on input feature vectors included in a voice signal of the speaker. Thus, the speaker recognition apparatus updates the registration database based on the sixth threshold greater than the second threshold. Referring to FIG. 4, in a typical approach where the aforementioned candidate list is not used, and when a first input feature vector 430 is input earlier in time than a second input feature vector 420, the input feature vector 430 may not be registered because the similarity between the input feature vector 430 and registered data 410 is less than a corresponding similarity constraint registration threshold. In contrast, in examples herein where the candidate list is used and the input feature vector 430 is at least added to a candidate list, even if the input feature vector 430 is input earlier than the input feature vector 420 and the similarity between the input feature vector 430 and the registered data 410 did not meet the second threshold at that earlier time, the input feature vector 430 may be additionally registered at a later time, e.g., subsequent to a time the second input feature vector 420 is input and found to have a similarity with the registered data 410 that meets the second threshold and is added to the registered data 410, based on a renewed similarity determination between the input feature vector 430 in the candidate list and the updated registered data 410, e.g., with the input feature vector 420 in the registration database, meeting, e.g., being greater than or equal to, the second threshold or the sixth threshold.

Figure 5:
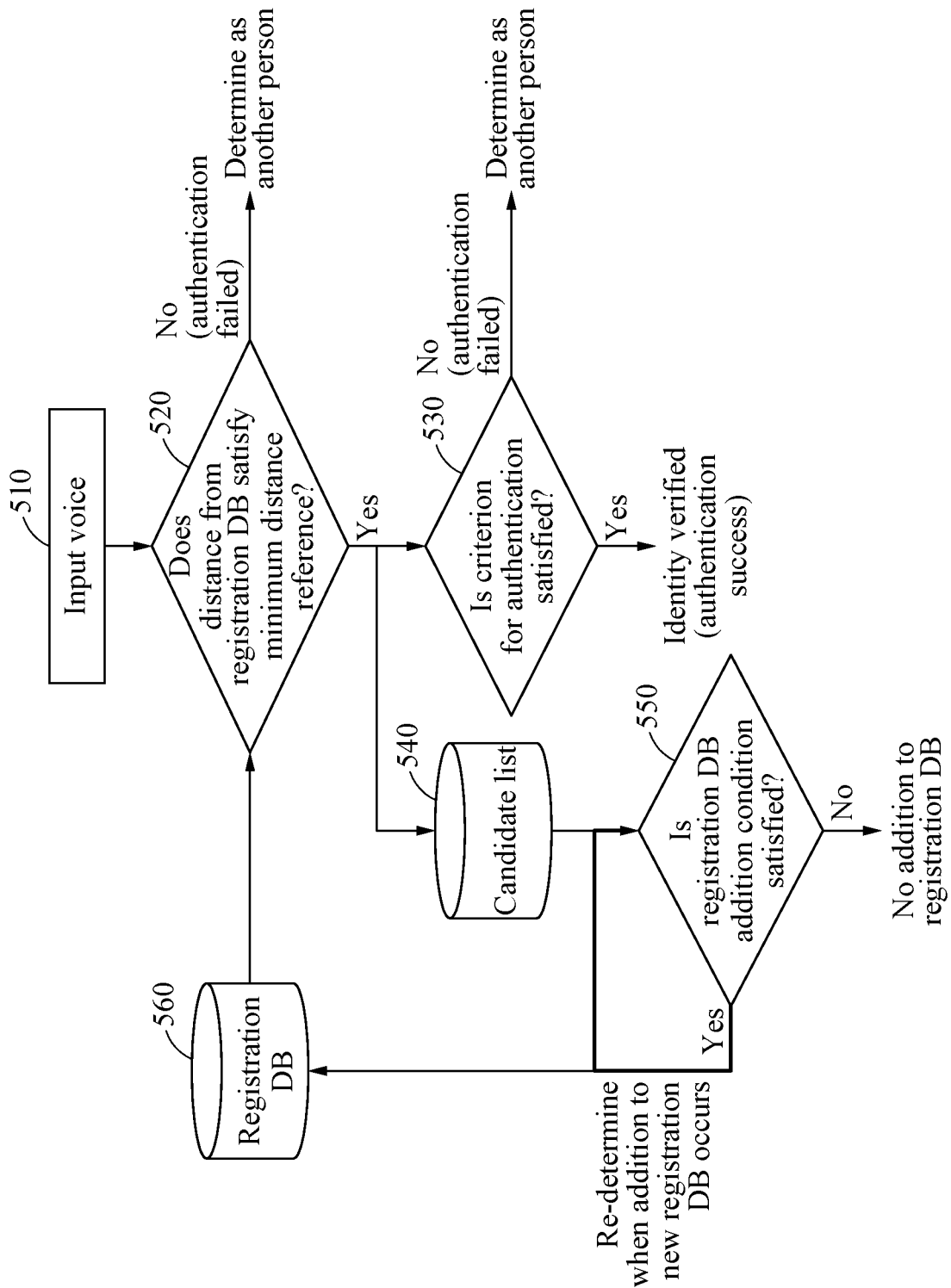
FIG. 5 illustrates an example method with speaker recognition and registration, according to one or more embodiments.

FIG. 5 illustrates an example method with speaker recognition and registration, according to one or more embodiments. The method of FIG. 5 may be implemented by a speaker recognition apparatus that may be the speaker recognition apparatus of FIG. 1, the speaker recognition apparatus of FIG. 2, the speaker recognition apparatus of FIG. 3, and/or the speaker recognition apparatus of FIG. 4, noting that such examples are for convenience of explanation with respect to one or more or more embodiments and are not intended to limit embodiments to the same. Operations of FIG. 5 may be performed in the order and manner shown, and the order of some operations may be changed or some operations may be omitted without departing from the spirit and scope of the illustrated embodiment. One or more operations of FIG. 5 may be performed in parallel or simultaneously.

Referring to FIG. 5, the speaker recognition apparatus receives an input voice 510 for speaker recognition. The speaker recognition apparatus generates an input feature vector from the input voice 510.

In operation 520, the speaker recognition apparatus references the registration database 560 and determines whether a distance between an input feature vector and registered data, for example, a registered feature model included in the registration database 560, satisfies (meets) a reference minimum distance. For example, the reference minimum distance may correspond to the first threshold, as the similarity constraint condition or candidate similarity criterion for determining a candidate list construction. When the input feature vector does not satisfy (meet) the reference minimum distance, the speaker recognition apparatus rejects or fails to perform an operation corresponding to the input voice 510 uttered by the speaker, e.g., without performing an additional operation for, or indicated in, the corresponding input voice.

In operation 530, when the input feature vector satisfies the reference minimum distance, the speaker recognition apparatus adds the input feature vector to a candidate list 540 and determines whether a criterion for authentication has been satisfied (met). For example, the criterion for authentication may correspond to the third threshold, as the similarity constraint condition or registered user similarity criterion for the speaker recognition operation. When the input feature vector does not satisfy (meet) the criterion for authentication, the speaker recognition apparatus rejects or fails to perform an operation corresponding to the input voice uttered by the speaker, e.g., without performing the additional operation for the corresponding input voice. When the input feature vector satisfies (meets) the criterion for authentication, the speaker recognition apparatus verifies the speaker having uttered the input voice 510 as a registered user, and may further perform any additional operation(s) for the corresponding input voice, e.g., as indicated by the input voice uttered by the speaker.

In operation 550, the speaker recognition apparatus determines whether input feature vectors included in the candidate list 540 satisfy (meet) a registration database addition condition by referencing the candidate list 540. For example, the registration database addition condition corresponds to the second threshold, as the similarity constraint condition or candidate similarity criterion for determining the registration database update with respect to the candidate list 540. When no input feature vector included in the candidate list 540 satisfies (meets) the registration database addition condition, the speaker recognition apparatus does not update the registration database 560 with any input feature vector from the candidate list 540. When any input feature vector included in the candidate list 540 satisfies (meets) the registration database addition condition, the speaker recognition apparatus updates the registration database 560 using such similarity-meeting input feature vector(s).

When an operation of updating the registration database 560 occurs, the speaker recognition apparatus may re-determine whether input feature vectors included in the updated registration database 560 still satisfy the registration database addition condition.

By using the voice signal of the speaker received in the speaker recognition operation, the speaker recognition apparatus may obtain registered voices of the speaker for various states and environments without direct intervention of the user for registration. In addition to the registration database 560, the speaker recognition apparatus may further include/store the candidate list 540, thereby incrementally obtaining registered voices for more various states and environments.

Figure 6:
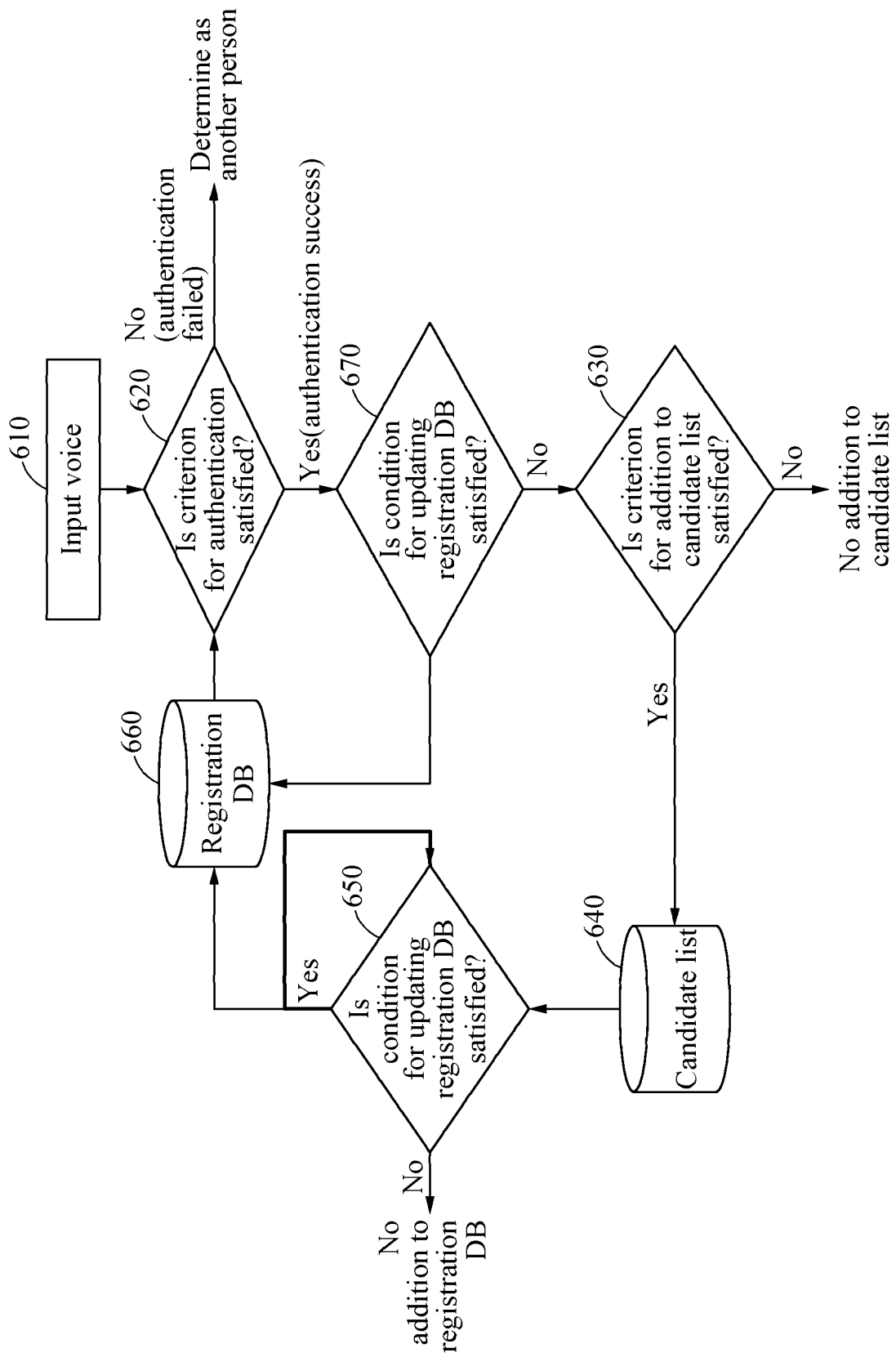
FIG. 6 illustrates an example method with speaker recognition and registration, according to one or more embodiments.

FIG. 6 illustrates an example method with speaker recognition and registration, according to one or more embodiments. The method of FIG. 6 may be implemented by a speaker recognition apparatus that may be the speaker recognition apparatus of FIG. 1, the speaker recognition apparatus of FIG. 2, the speaker recognition apparatus of FIG. 3, the speaker recognition apparatus of FIG. 4, and/or the speaker recognition apparatus of FIG. 5, noting that such examples are for convenience of explanation with respect to one or more or more embodiments and are not intended to limit embodiments to the same. Operations of FIG. 6 may be performed in the order and manner shown, and the order of some operations may be changed or some operations may be omitted without departing from the spirit and scope of the illustrated embodiment. One or more operations of FIG. 6 may be performed in parallel or simultaneously.

A third threshold, as a similarity constraint condition or registered user similarity criterion for a speaker recognition operation, may be greater than a first threshold, which is a similarity constraint condition or candidate similarity criterion for determining a candidate list construction. In some cases, the third threshold may also be less than or equal to the first threshold.

In the example of FIG. 5, for example, the first threshold is less than the third threshold, while in the example of FIG. 6, the first threshold may be greater than or equal to the third threshold.

For example, an input voice 610 of FIG. 6 may correspond to the input voice 510 of FIG. 5. Operation 620 of FIG. 6 of determining whether a criterion for authentication is satisfied (met) may correspond to operation 530 of determining whether the criterion for authentication is satisfied (met) in FIG. 5. Operation 630 of FIG. 6 of determining whether a criterion for addition to a candidate list is satisfied may correspond to operation 520 of determining whether the reference minimum distance is satisfied (met) in FIG. 5. A candidate list 640 of FIG. 6 may correspond to the candidate list 540 of FIG. 5. Operation 650 of FIG. 6 of determining whether a condition for updating a registration database is satisfied (met) may correspond to operation 550 of determining whether the condition for the registration database update is satisfied in FIG. 5. A registration database 660 of FIG. 6 may correspond to the registration database 560. Accordingly, for brevity purposes, repeated descriptions of these operations 610 through 650, candidate list 640, and registration database 660 corresponding to operations, candidate list, and registration database of FIG. 5 are omitted.

In operation 670, the speaker recognition apparatus determines whether at least one input feature vector corresponding to a voice signal of a speaker satisfies a condition for updating a registration database, which will be explained in greater detail further below.

Figure 7:
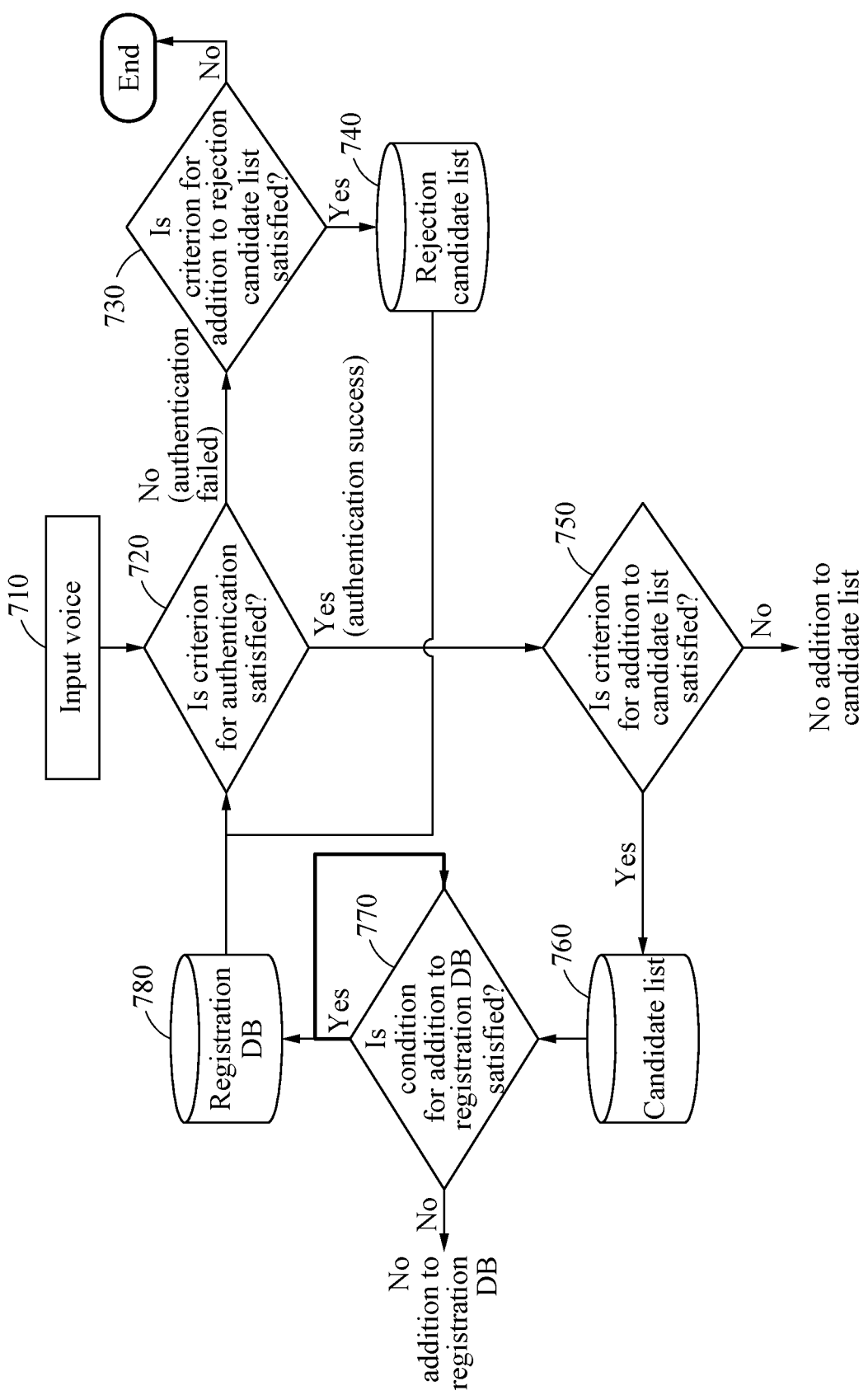
FIG. 7 illustrates an example method with speaker recognition and registration using a rejection candidate list, according to one or more embodiments.

FIG. 7 illustrates an example method with speaker recognition and registration performed using a rejection candidate list, according to one or more embodiments. The method of FIG. 7 may be implemented by a speaker recognition apparatus that may be the speaker recognition apparatus of FIG. 1, the speaker recognition apparatus of FIG. 2, the speaker recognition apparatus of FIG. 3, the speaker recognition apparatus of FIG. 4, the speaker recognition apparatus of FIG. 5, and/or the speaker recognition apparatus of FIG. 6, noting that such examples are for convenience of explanation with respect to one or more or more embodiments and are not intended to limit embodiments to the same. Operations of FIG. 7 may be performed in the order and manner shown, and the order of some operations may be changed or some operations may be omitted without departing from the spirit and scope of the illustrated embodiment. One or more operations of FIG. 7 may be performed in parallel or simultaneously.

Referring to FIG. 7, an input voice 710 may correspond to the input voice 610, operation 720 of determining whether a criterion for authentication is satisfied (met) may correspond to operation 620 of FIG. 6, operation 750 of determining whether a criterion for addition to a candidate list is satisfied (met) may correspond to operation 630 of FIG. 6, a candidate list 760 may correspond to the candidate list 640 of FIG. 6, operation 770 determining whether a condition for updating a registration database is satisfied (met) may correspond to operation 650 of FIG. 6, and a registration database 780 may correspond to the registration database 660 of FIG. 6. Accordingly, for brevity purposes, repeated descriptions of these operations 710 through 770, candidate list 760, and registration database 780 corresponding to operations, candidate list, and registration database of FIG. 6 are omitted.

In operation 730, when an input feature vector does not satisfy (meet) the criterion for authentication in operation 720, a speaker recognition apparatus determines whether the input feature vector satisfies a criterion for addition to a rejection candidate list. For example, the criterion for addition to the rejection candidate list corresponds to a fourth threshold, as a similarity constraint condition of determining whether to construct or add to a rejection candidate list. The fourth threshold may be less than the third threshold, as the similarity constraint condition or registered user similarity criterion of the speaker recognition operation. When the input feature vector satisfies (meets) the criterion for addition to the rejection candidate list, speaker recognition apparatus adds the input feature vector to a rejection candidate list 740.

When determining whether the criterion for authentication is satisfied in operation 720, the speaker recognition apparatus references the rejection candidate list 740. For example, when it is determined ambiguous to determine whether a speaker is a registered user or not by using only the registration database 780, the speaker recognition apparatus may use the rejection candidate list 740 to effectively make the determination that the speaker is an unregistered user.

Figure 8:
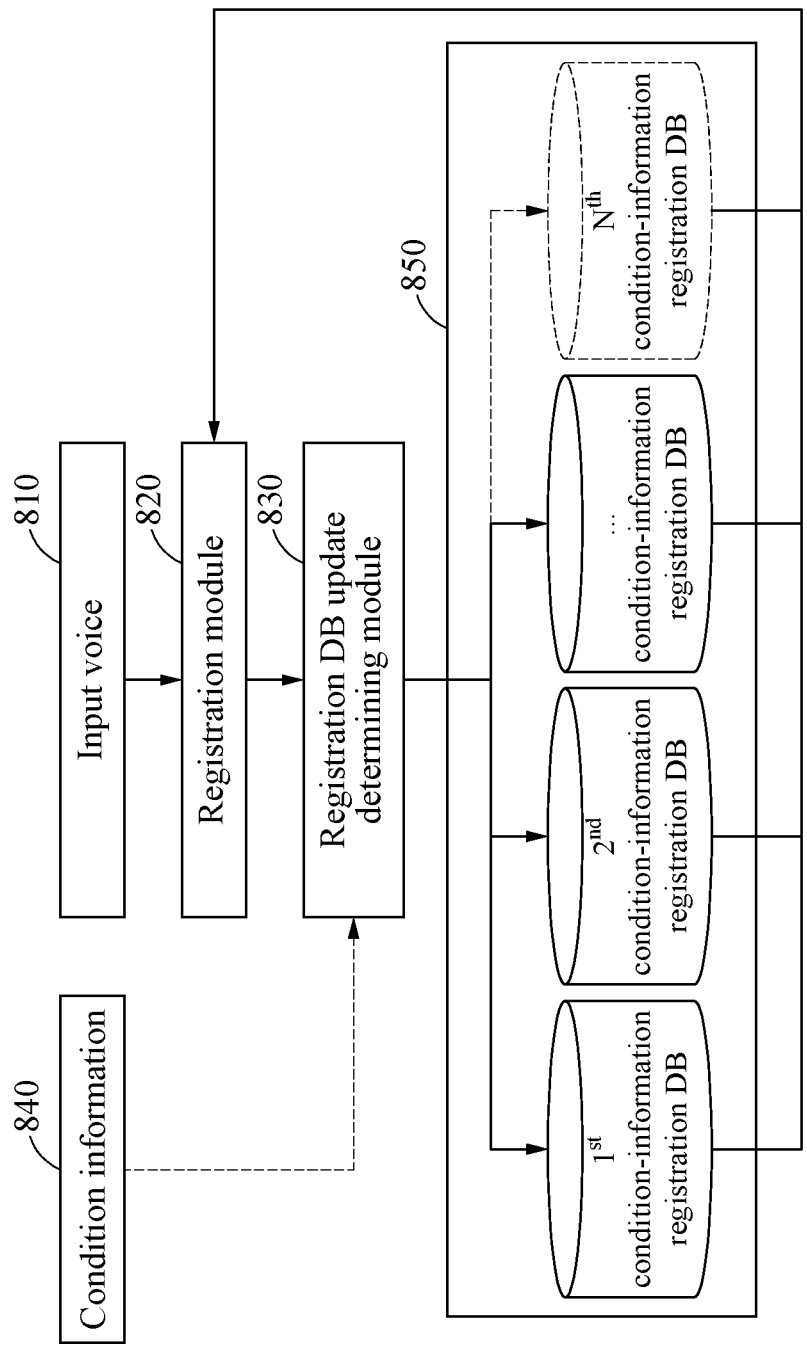
FIG. 8 illustrates an example method of updating a registration database based on condition information of a speaker, according to one or more embodiments.

FIG. 8 illustrates an example method of updating a registration database based on condition information of a speaker, according to one or more embodiments. The method of FIG. 8 may be implemented by a speaker recognition apparatus that may be the speaker recognition apparatus of FIG. 1, the speaker recognition apparatus of FIG. 2, the speaker recognition apparatus of FIG. 3, the speaker recognition apparatus of FIG. 4, the speaker recognition apparatus of FIG. 5, the speaker recognition apparatus of FIG. 6, and/or the speaker recognition apparatus of FIG. 7, noting that such examples are for convenience of explanation with respect to one or more or more embodiments and are not intended to limit embodiments to the same. Operations of FIG. 8 may be performed in the order and manner shown, and the order of some operations may be changed or some operations may be omitted without departing from the spirit and scope of the illustrated embodiment. One or more operations of FIG. 8 may be performed in parallel or simultaneously.

Referring to FIG. 8, a registration database 850 may include a plurality of condition-information registration databases corresponding to speaker condition information 840 of a plurality of speakers. The speaker condition information 840 may be information associated with the voices of each speaker affecting respective voice/speaker recognitions and information associated with ambient environments in which such voice/speaker recognitions have or may be performed. The voice of any particular speaker may change or vary based on emotion, age, and health state. Also, a recognition performance for any particular speaker may vary based on the existing noise environment, venue where the voice/speaker recognition is being performed, and the like.

The speaker condition information 840 may be estimated, modeled, or predicted using a given or separate recognition module 820, e.g., which may correspond to or be implemented by one or more processors of the speaker recognition apparatus. The condition-information registration databases are updated based on the estimated speaker condition information 840. For example, by analyzing an input voice 810, the registration module 820 estimates the speaker condition information 840 such as the estimation resultantly indicating that there is 70% probability of that the input voice 810 is an angry voice, an 80% probability that the input voice 810 corresponds to a morning voice, a 90% probability that the input voice 810 is a voice received or captured from a quiet environment, and the like.

A registration database update determining module 830 may stochastically update the plurality of condition-information registration databases based on the speaker condition information 840. The registration database update determining module 830 may correspond to or be implemented by one or more processors of the speaker recognition apparatus. The registration database update determining module 830 selects condition-information registration databases to be updated, based on the speaker condition information 840. The registration database update determining module 830 stochastically updates the selected condition-information registration databases. For example, the registration database update determining module 830 selects a registration database for an angry state, a registration database for a morning condition, and a registration database for a condition in a quiet environment. In this example, the registration database update determining module 830 updates each of the condition-information registration databases based on a ratio corresponding to a probability for each condition information.

When similarities between the input feature vector and existing condition-information registration databases are less than or equal to a predetermined level, for example, the speaker recognition apparatus may generate a new condition-information registration database.

Figure 9:
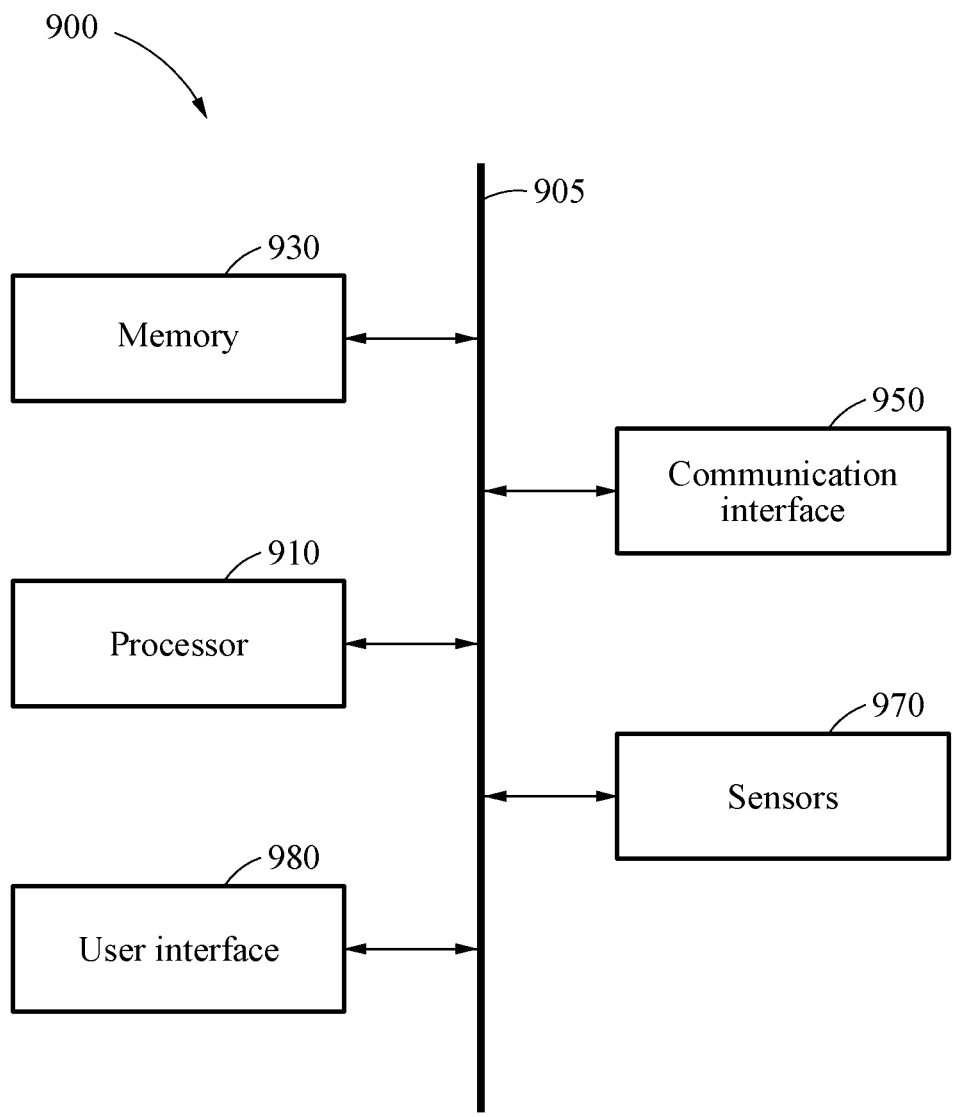
FIG. 9 is a block diagram illustrating an example apparatus with speaker recognition, according to one or more embodiments.

FIG. 9 is a block diagram illustrating an example apparatus with speaker recognition, according to one or more embodiments.

Hereinafter the speaker recognition apparatus may also be referred to as a registration apparatus 900 with, or for, speaker recognition where the speaker recognition apparatus may acquire a registered voice during an example speaker recognition operation of the speaker recognition apparatus. In an example, the speaker recognition apparatus may correspond to any one, any combination, or all speaker recognition apparatuses described above with respect to FIGS. 1-8.

Referring to FIG. 9, the registration apparatus 900 includes a processor 910. The registration apparatus 900 further includes a memory 930, a communication interface 950, sensors 970, and a user interface 980, as non-limiting examples. The processor 910, the memory 930, the communication interface 950, the sensors 970, and the user interface 980 communicate through a communication bus 905. The processor 910 is representative herein of being one or more processors 910, and the memory 910 is representative herein of being one or more memories 930.

The processor 910 selectively constructs a candidate list. For example, the processor 910 constructs (or adds to) a candidate list to include input feature vectors whose respective determined similarities with at least one registered data included in a registration database meet, e.g., are greater or equal to, a first threshold. These input feature vectors are from among one or more input feature vectors corresponding to a voice signal of the speaker.

The processor 910 selectively updates the registration database. For example, the processor 910 updates the registration database using or based on an input feature vector, among input feature vectors included in the candidate list, that has a determined similarity with the registered data that meets, e.g., is greater than or equal to, a second threshold.

The processor 910 selectively constructs the candidate list. For example, the processor 910 constructs the candidate using or based on an input feature vector, corresponding to a voice signal of the speaker, that has a determined similarity with the registered data that is greater than or equal to the first threshold and less than the second threshold, or greater than the first threshold and less than or equal to the second threshold. The processor 910 selectively updates the registration database. For example, the processor 910 updates the registration database based on an input feature vector, among input feature vectors included the candidate list, that has a determined similarity with the registered data that meets, e.g., is greater than or equal to, the second threshold.

The memory 930 includes the candidate list, and the registration database. The memory 930 may include a volatile memory and/or a non-volatile memory.

The sensors 970 include, for example, an acoustic sensor that receives a voice signal of a speaker. The sensors 970 collect a variety of acoustic information. An example sensor 970 may be a microphone. The user interface 980 may include an output, e.g., a display and/or speaker, as well as an input for control and interaction with the apparatus. For example, the user interface 980 may output the aforementioned messaging indicating "unregistered user" when a received or captured voice signal is determined to not correspond to a registered user.

In an example, when updating the registration database, the processor 910 determines whether an input feature vector exists, among the input feature vectors included in the candidate list, with a determined similarity with at least one registered data included in the updated registration database that meets, e.g., is greater than or equal to, the second threshold.

The processor 910 selectively performs the speaker recognition. For example, the processor 910 performs the speaker recognition based on an input feature vector, among the one or more input feature vectors corresponding to the voice signal of the speaker, being determined to have a similarity with the registered data that meets, e.g., is greater than or equal to, a third threshold.

The processor 910 selectively constructs a rejection candidate list. For example, the processor 910 constructs the rejection candidate list based on an input feature vector, among the one or more input feature vectors corresponding to the voice signal of the speaker, that has a determined similarity with the registered data that does not meet, e.g., is less than or equal to, a fourth threshold.

The processor 910 selectively generates a new registered data model. For example, the processor 910 generates the new registered data model to include or based on an input feature vector, among the input feature vectors included in the candidate list, that has a determined similarity with a previous registered data model included in the registration database that meets, e.g., is greater than or equal to, the second threshold. The processor 910 may then calculate a similarity between the previous registered data model and the new registered data model and update the registration database based on the calculated similarity.

The processor 910 may generates a new registered data model to include or based on an input feature vector, among input feature vectors corresponding to the voice signal of the speaker, that has a determined similarity with a previous registered data model included in the registration database that meets, e.g., is greater than or equal to, the second threshold. The processor 910 may then calculate a similarity between the previous registered data model and this new registered data model and update the registration database based on the calculated similarity.

In one or more example, when such similarities between the previous registered data model and the new registered data model meet, e.g., are greater than or equal to, a fifth threshold, the processor 910 changes the previous registered data model using the input feature vector included in the new registered data model. When such similarities fail to meet, e.g., are less than the fifth threshold, the processor 910 adds the new registered data model to the registration database.

The processor 910 acquires condition information of at least one input feature vector corresponding to a voice signal of the speaker, and updates the condition-information registration database based on the condition information of the input feature vector.

In addition, the processor 910 performs at least one of the methods described with reference to FIGS. 1 through 8, demonstrating example algorithms corresponding to same. The processor 910 stores instructions, e.g., program codes or programs, in the memory 930, and through execution of the instructions by the processor 910, the processor 910 may be configured to perform any one, any combination, or all operations described herein. In an example, the registration apparatus 900 may be connected to an external device, for example, a personal computer or network through an input and output (I/O) device to perform a data exchange. In addition to providing communication between components, the communication bus 905 is also representative of the input and output (I/O) device. The registration apparatus 900 may be, or may be included in, various computing devices and/or systems such as a smartphone, a tablet computer, a laptop computer, a desktop computer, a television, a wearable device, a security system, a smart home system, and the like, for example. The registration or recognition system may be utilized as an access control to, for example, a car, a building, a bank account, and other security purposes, in various examples.

The speaker recognition apparatuses, registration apparatuses, memories, processors, processor 123, processor 910, memory 930, communication interface 950, communication bus 905, sensors 970, user interface 980, and apparatuses, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   determining whether an input feature vector, among one or more input feature vectors corresponding to a voice signal of a speaker, meets a candidate similarity criterion with at least one registered data included in a registration database;
   selectively, based on a result of the determining of whether the input feature vector meets the candidate similarity criterion, constructing a candidate list based on the input feature vector;
   determining whether a candidate input feature vector, among one or more candidate input feature vectors constructed in the candidate list in the selective constructing of the candidate list, meets a predetermined registration update similarity criterion different than the candidate similarity criterion with the at least one registered data; and
   selectively, based on a result of the determination of whether the candidate input feature vector meets the registration update similarity criterion, updating the registration database based on the candidate input feature vector.

2. The method of claim 1, further comprising:
   performing a speaker verifying operation by verifying or identifying a current speaker based on whether a feature vector corresponding to a current voice signal of the current speaker meets a registered user similarity criterion with respect to the updated registration database.

3. The method of claim 1, further comprising:
   performing a speaker verifying operation by verifying or identifying a current speaker based on whether a feature vector corresponding to a current voice signal of the current speaker meets a registered user similarity criterion with respect to the registration database.

4. The method of claim 1, further comprising:
   performing a speaker verifying operation by verifying or identifying the speaker based on whether the input feature vector corresponding to the voice signal of the speaker meets a registered user similarity criterion with respect to the registration database or the updated registration database.

5. The method of claim 4, further comprising:
   in response to the input feature vector not meeting the registered user similarity criterion, constructing a rejection candidate list based on the input feature vector.

6. The method of claim 5, further comprising:
   performing another speaker verifying operation by verifying or identifying a current speaker based on whether a feature vector corresponding to a current voice signal of the current speaker meets the registered user similarity criterion with respect to the registration database or the updated registration database, and based on the rejection candidate list.

7. The method of claim 4, wherein the registered user similarity criterion is a lesser similarity requiring criterion than the registration update similarity criterion.

8. The method of claim 1, wherein the determining of whether the candidate input feature vector meets the registration update similarity criterion, and the selective updating of the registration database are automatically performed based on a predetermined period.

9. The method of claim 1, wherein the constructing of the candidate list based on the input feature vector includes adding the input feature vector to an existing candidate list that includes at least one of the one or more of the candidate input feature vectors.

10. The method of claim 1,
    wherein the registration database comprises at least one condition-information registration database corresponding to condition information of one or more speakers, and
    wherein the updating of the registration database comprises:
       acquiring condition information of one or more feature vectors corresponding to respective voice signals of the speaker; and
       updating the condition-information registration database based on the condition information of the one or more feature vectors.

11. The method of claim 1,
    wherein the candidate similarity criterion is a first threshold and the registration update similarity criterion is a second threshold, and
    wherein the second threshold is greater than the first threshold.

12. The method of claim 1, wherein the selective constructing of the candidate list based on the result of the determining of whether the input feature vector meets the candidate similarity criterion comprises:
    selecting to construct the candidate list based on the input feature vector meeting the candidate similarity criterion and not meeting the registration update similarity criterion.

13. The method of claim 1, wherein the selective updating of the registration database includes selectively updating the registration database based on whether the input feature vector meets the registration update similarity criterion with the at least one registered data.

14. The method of claim 13, wherein, when the input feature vector meets the registration update similarity criterion and the updating of the registration database is resultantly selected, the updating of the registration database comprises:
    generating a new registered data model including a feature vector, among the one or more input feature vectors corresponding to the voice signal of a speaker, that meets the registration update similarity criterion with respect to a previous registered data model included in the registration database;
    calculating a similarity between the previous registered data model and the new registered data model; and
    updating the registration database based on the calculated similarity.

15. A non-transitory computer-readable storage medium storing instructions that, when executed by a processor, cause the processor to perform the method of claim 1.

16. A processor-implemented method, the method comprising:
   determining whether an input feature vector, among one or more input feature vectors corresponding to a voice signal of a speaker, meets a candidate similarity criterion with at least one registered data included in a registration database;
   selectively, based on a result of the determining of whether the input feature vector meets the candidate similarity criterion, constructing a candidate list based on the input feature vector;
   determining whether a candidate input feature vector, among one or more candidate input feature vectors constructed in the candidate list in the selective constructing of the candidate list, meets a registration update similarity criterion with the at least one registered data; and
   selectively, based on a result of the determination of whether the candidate input feature vector meets the registration update similarity criterion, updating the registration database based on the candidate input feature vector,
   wherein
   the at least one registered data comprises at least one of a registration feature vector and a registration feature model,
   the registration feature vector is classified into a plurality of groups based on a predetermined criterion, and
   the registration feature model is determined based on respective registration feature vectors included in each of the plurality of groups.

17. A processor-implemented method, the method comprising:
   determining whether an input feature vector, among one or more input feature vectors corresponding to a voice signal of a speaker, meets a candidate similarity criterion with at least one registered data included in a registration database;
   selectively, based on a result of the determining of whether the input feature vector meets the candidate similarity criterion, constructing a candidate list based on the input feature vector;
   determining whether a candidate input feature vector, among one or more candidate input feature vectors constructed in the candidate list in the selective constructing of the candidate list, meets a registration update similarity criterion with the at least one registered data; and
   selectively, based on a result of the determination of whether the candidate input feature vector meets the registration update similarity criterion, updating the registration database based on the candidate input feature vector,
   wherein the updating of the registration database comprises:
      generating a new registered data model including a feature vector, among candidate input feature vectors in the candidate list, that meets the registration update similarity criterion with respect to a previous registered data model included in the registration database;
      calculating a similarity between the previous registered data model and the new registered data model; and
      updating the registration database based on the calculated similarity.

18. The method of claim 17, wherein the updating of the registration database based on the calculated similarity comprises:
   changing the previous registered data model using the feature vector included in the new registered data model when the calculated similarity meets a predetermined similarity threshold; and
   adding the new registered data model to the registration database when the calculated similarity does not meet the predetermined similarity threshold.

19. The method of claim 18, wherein the changing of the previous registered data model comprises:
   changing the previous registered data model based on a value corresponding to a weighted sum of feature vectors included in the new registered data model and the previous registered data model.

20. The method of claim 18, wherein the changing of the previous registered data model comprises:
   changing the previous registered data model to the new registered data model, based on the feature vector included in the new registered data model and another feature vector included in the previous registered data model.

21. A processor-implemented method, the method comprising:
   determining whether a candidate input feature vector, among one or more candidate input feature vectors constructed in a candidate list in respective one or more previous speaker verifying operations, meets a predetermined registration update similarity criterion with registered data of a registration database;
   selectively, based on a result of the determination of whether the candidate input feature vector meets the registration update similarity criterion, updating the registration database based on the candidate input feature vector; and
   performing a speaker verifying operation by verifying a speaker based on whether an input feature vector, corresponding to a current voice signal of the speaker, meets a registered user similarity criterion with respect to the updated registration database.

22. The method of claim 21, further comprising constructing the candidate list to include the candidate input feature vector based on: the candidate input feature vector having met a candidate similarity criterion with the registered data included in the registration database prior to the selective updating of the registration database; and the candidate input feature vector having not met the registered user similarity criterion with respect to the registration database prior to the selective updating of the registration database.

23. The method of claim 21, further comprising constructing the candidate list to include the candidate input feature vector based on: the candidate input feature vector having met a candidate similarity criterion with the registered data included in the registration database prior to the selective updating of the registration database; and the candidate input feature vector having met the registered user similarity criterion with respect to the registration database prior to the selective updating of the registration database.

24. A processor-implemented method, the method comprising:
   performing a speaker verifying operation by verifying or identifying a speaker based on whether an input feature vector corresponding to a voice signal of the speaker meets a registered user similarity criterion with respect to a registration database;

selectively, based on whether the input feature vector meets a candidate similarity criterion with respect to the registration database, constructing a candidate list based on the input feature vector; and selectively, based on whether a candidate input feature vector resulting from the selective constructing of the candidate list meets a predetermined registration update similarity criterion different than the candidate similarity criterion with respect to the registration database, updating the registration database based on the candidate input feature vector.

25. The method of claim 24, wherein the constructing of the candidate list is selectively performed further dependent on a result of the speaker verifying operation.

26. An apparatus, the apparatus comprising:
one or more processors configured to:
selectively, dependent on whether an input feature vector corresponding to a voice signal of a speaker meets a candidate similarity criterion with a registered data included in a registration database, construct a candidate list based on the input feature vector; and
selectively, dependent on whether a candidate input feature vector constructed in the candidate list meets a predetermined registration update similarity criterion different than the candidate similarity criterion with respect to the registration database, update the registration database based on the candidate input feature vector.

27. The apparatus of claim 26, wherein the one or more processors are further configured to:
perform a speaker verifying operation to verify or identify a current speaker based on whether a feature vector corresponding to a current voice signal of the current speaker meets a registered user similarity criterion with respect to the updated registration database.

28. The apparatus of claim 26, wherein the one or more processors are further configured to:
perform a speaker verifying operation to verify or identify a current speaker based on whether a feature vector corresponding to a current voice signal of the current speaker meets a registered user similarity criterion with respect to the registration database.

29. The apparatus of claim 26, wherein the one or more processors are further configured to:
perform a speaker verifying operation to verify or identify the speaker based on whether the input feature vector corresponding to the voice signal of the speaker meets a registered user similarity criterion with respect to the registration database or the updated registration database.

30. The apparatus of claim 29, wherein the one or more processors are further configured to:
in response to the input feature vector being determined to not meet the registered user similarity criterion, construct a rejection candidate list based on the input feature vector.

31. The apparatus of claim 30, wherein the one or more processors are further configured to:
perform another speaker verifying operation to verify or identify a current speaker based on whether a feature vector corresponding to a current voice signal of the current speaker meets the registered user similarity criterion with respect to the registration database or the updated registration database, and based on the rejection candidate list.

32. The apparatus of claim 29, wherein the one or more processors are configured to select to perform the construction of the candidate list based on the input feature when the input feature vector meets the candidate similarity criterion and the input feature vector does not meet the registered user similarity criterion.

33. The apparatus of claim 29, wherein the one or more processors are configured to select to perform the construction of the candidate list based on the input feature when the input feature vector meets the candidate similarity criterion and the input feature vector meets the registered user similarity criterion.

34. The apparatus of claim 29, further comprising a memory storing instructions that when executed by the one or more processors configure the one or more processors to perform the selective construction of the candidate list, the selective update of the registration database, and the performance of the speaker verifying operation.

35. The apparatus of claim 26, wherein the registered user similarity criterion is a lesser similarity requiring criterion than the registration update similarity criterion.

36. The apparatus of claim 26, wherein, for the updating of the registration database, the one or more processors are configured to:
generate a new registered data model including a feature vector, among candidate input feature vectors in the candidate list, that meets the registration update similarity criterion with respect to a previous registered data model included in the registration database;
calculate a similarity between the previous registered data model and the new registered data model; and
update the registration database based on the calculated similarity.

37. The apparatus of claim 36, wherein, for the updating of the registration database based on the calculated similarity, the one or more processors are configured to:
change the previous registered data model using the feature vector included in the new registered data model when the calculated similarity meets a predetermined similarity threshold; and
add the new registered data model to the registration database when the calculated similarity does not meet the predetermined similarity threshold.

38. The apparatus of claim 36,
wherein the registration database comprises at least one condition-information registration database corresponding to condition information of one or more speakers, and
wherein, for the updating of the registration database, the one or more processors are configured to acquire condition information of one or more feature vectors corresponding to respective voice signals of the speaker, and update the condition-information registration database based on the condition information of the one or more feature vectors.

39. The apparatus of claim 26, wherein, for the selective construction of the candidate list, the one or more processors are configured to select to perform the construction of the candidate list in response to the input feature vector being determined to meet the candidate similarity criterion and determined to not meet the registration update similarity criterion.

40. The apparatus of claim 26, wherein, for the selective update of the registration database, the one or more processors are configured to update the registration database in response to the input feature vector being determined to meet the registration update similarity criterion with the registered data.

\* \* \* \* \*